(12) United States Patent
Schoenfeld et al.

(10) Patent No.: US 12,505,554 B2
(45) Date of Patent: Dec. 23, 2025

(54) DEVICE AND COMPUTER-IMPLEMENTED METHOD FOR DETERMINING PIXELS OF A SYNTHETIC IMAGE

(71) Applicant: Robert Bosch GmbH, Stuttgart (DE)

(72) Inventors: Edgar Schoenfeld, Tuebingen (DE); Anna Khoreva, Stuttgart (DE); Julio Borges, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 433 days.

(21) Appl. No.: 18/312,416

(22) Filed: May 4, 2023

(65) Prior Publication Data
US 2023/0386046 A1 Nov. 30, 2023

(30) Foreign Application Priority Data

May 27, 2022 (EP) ..................................... 22175794

(51) Int. Cl.
*G06T 7/11* (2017.01)
*G06T 19/20* (2011.01)

(52) U.S. Cl.
CPC ............... *G06T 7/11* (2017.01); *G06T 19/20* (2013.01)

(58) Field of Classification Search
CPC .................................. G06T 7/11; G06T 19/20
USPC ........................................................ 382/164
See application file for complete search history.

(56) References Cited

U.S. PATENT DOCUMENTS

| 2022/0138897 A1* | 5/2022 | Singh | G06T 3/147 |
| | | | 382/159 |
| 2023/0045076 A1* | 2/2023 | Huang | G06N 3/045 |
| 2023/0053588 A1* | 2/2023 | Li | G06V 10/52 |
| 2023/0351566 A1* | 11/2023 | Jeon | G06V 10/513 |
| 2023/0419695 A1* | 12/2023 | Akers | G06N 3/045 |
| 2024/0265628 A1* | 8/2024 | Xu | G06T 3/4053 |

OTHER PUBLICATIONS

Sushko et al. "You Only Need Adversarial Supervision for Semantic Image Synthesis" arXiv (2021); pp. 1-32.
Wang et al. "High-Resolution Image Synthesis and Semantic Manipulation with Conditional GANs" 2018 IEEE/CVF Conference on Computer Vision and Pattern Recognition (2018); pp. 8798-8807.
Ling et al. "EditGAN: High-Precision Semantic Image Editing" arXiv (2021); pp. 1-38.
Pavllo et al. "Controlling Style and Semantics in Weakly-Supervised Image Generation" arXiv (2019); pp. 1-15.

* cited by examiner

*Primary Examiner* — Allen H Nguyen
(74) *Attorney, Agent, or Firm* — NORTON ROSE FULBRIGHT US LLP (57) ABSTRACT

A device and computer-implemented method for determining pixels of a synthetic image. The method comprises providing a generator that is configured to determine an output from a first input comprising a label map and a first latent code, wherein the label map comprises a mapping of at least one class to at least one of the pixels, wherein the method comprises providing the label map and a latent code, wherein the latent code comprises input data points in a latent space, providing a first direction for moving input data points in the latent space, determining the first latent code depending on at least one input data point of the latent code that is moved in the first direction, determining the synthetic image depending on an output of the generator for the first input.

14 Claims, 6 Drawing Sheets

DEVICE AND COMPUTER-IMPLEMENTED METHOD FOR DETERMINING PIXELS OF A SYNTHETIC IMAGE

CROSS REFERENCE

The present application claims the benefit under 35 U.S.C. § 119 of European Patent Application No. EP 22 17 5794.1 filed on May 27, 2022, which is expressly incorporated herein by reference in its entirety.

BACKGROUND INFORMATION

Semantic image synthesis, SIS, transforms user-specified semantic layouts to realistic images. Its applications range widely from image editing and content creation to synthetic data augmentation, where training data is generated to fulfill specific semantic requirements.

Generative Adversarial Networks, GANs, are a tool for SIS. Schönfeld, E., Sushko, V., Zhang, D., Gall, J., Schiele, B., Khoreva, A.; "You only need adversarial supervision for semantic image synthesis;" in: International Conference on Learning Representations (ICLR) (2020) describes an example of synthesis of images and their alignment to input semantic label maps with high visual quality.

It is desirable to control the synthesis process of semantic classes specified in a label map with GAN-based SIS models to allow a user to perform targeted local edits of a specific class in an image that is generated by the GAN-based SIS model.

SUMMARY

The present invention provides a device and a computer-implemented method for determining pixels of a synthetic image allow to control the synthesis process of semantic classes specified in a label map.

According to an example embodiment of the present invention, the computer-implemented method comprises providing a generator that is configured to determine an output from a first input comprising a label map and a first latent code, wherein the label map comprises a mapping of at least one class to at least one of the pixels, wherein the method comprises providing the label map and a latent code, wherein the latent code comprises input data points in a latent space, providing a first direction for moving input data points in the latent space, determining the first latent code depending on at least one input data point of the latent code that is moved in the first direction, determining the synthetic image depending on an output of the generator for the first input. The first directions are latent directions that alter pixels in a meaningful interpretable way.

According to an example embodiment of the present invention, the first input may comprise a class mask, wherein the class mask indicates the input data points to be moved in the first direction for a class, wherein providing the first direction comprises providing the class, providing a set of directions for moving input data points indicated by the class mask in the latent space, and selecting the first direction from the set of directions. The class specific first directions are latent directions that alter pixels of a chosen class in a meaningful interpretable way.

According to an example embodiment of the present invention, the generator may comprise an input layer for receiving the first input and an output layer for the output and at least one intermediate layer between the input layer and the output layer, wherein the at least one intermediate layer is configured to determine a set of features in the latent space depending on the first input, wherein providing the set of directions comprises determining the set of directions that maximizes distances between different pairs of sets of features that the at least one intermediate layer outputs for different first inputs, wherein the different first inputs comprise the same label map and vary by the first direction that is used for determining the first latent code from the same latent code, or wherein providing the set of directions for the class comprises determining, for pixels indicated by the class mask to be considered, the set of directions that maximizes distances between different pairs of sets of features that the at least one intermediate layer outputs for different first inputs, wherein the different first inputs comprise the same label map and the same class mask and vary by the first direction that is used for determining the first latent code from the same latent code. This machine learning aims to ensure that the set of found latent directions applied to identical input latent code yields maximally different semantic visual effects, i.e. changes of an appearance of the chosen class in different ways.

According to an example embodiment of the present invention, providing the set of directions for the class may comprise determining, for pixels, indicated by the class mask to be considered, the set of directions that maximizes distances between different pairs of sets of features that the at least one intermediate layer outputs for different first inputs, wherein the different first inputs comprise the same label map and the same class mask and vary by the first direction that is used for determining the first latent code from the same latent code. This machine learning aims to ensure that the set of found latent directions affects an image area of the synthetic image belonging to the class.

According to an example embodiment of the present invention, providing the set of directions for the class may comprise determining the set of directions that maximizes distances between different pairs of sets of features that the at least one intermediate layer outputs for different first inputs, wherein the different first inputs comprise the same label map and vary by the latent code that is used for determining the first latent code with the same first direction, or determining, for pixels, indicated by the class mask to be considered, the set of directions that maximizes distances between different pairs of sets of features that the at least one intermediate layer outputs for different first inputs, wherein the different first inputs comprise the same label map and the same class mask and vary by the latent code that is used for determining the first latent code with the same first direction. This machine learning aims to ensure that the change is consistent for different latent code.

According to an example embodiment of the present invention, providing the class mask may comprise determining the class mask depending on the label map and the class, wherein the class mask specifies pixels in the synthetic image that the label map specifies as pixels of the class.

According to an example embodiment of the present invention, determining the first latent code may comprises moving the latent code or a part of the latent code in the first direction in particular with a given intensity. This alters the latent code in across classes.

According to an example embodiment of the present invention, the method may comprise selecting the part of the latent code depending on the class mask. This alters the latent code in areas identified by the class mask.

According to an example embodiment of the present invention, the latent code may be spatially aligned with the class mask and/or the label map and/or the synthetic image.

According to an example embodiment of the present invention, the generator may comprises a first layer of neurons and a second layer of neurons, wherein determining the synthetic image may comprise providing the first input to the first layer, determining a second input comprising either the first latent code or a second latent code, and providing the second input to the second layer. The latent code may be injected into the generator at various layer.

Determining the second input may comprise changing the latent code depending on either the first direction or a second direction or in that determining the second input comprises providing an other latent code and changing the other latent code depending on either the first direction or a second direction. The latent code may be moved in different directions and injected into different layers.

Determining the second input may comprise determining the second direction depending on the at least one semantic class.

According to an example embodiment of the present invention, the method may comprise synthesizing a plurality of the synthetic images with the same label map and with different first directions and/or testing a robustness or functionality of an application for processing digital images depending on a plurality of the synthetic images. For data autmentation this method synthesizes diverse data points for data autmentation. For data validation, this method uses diverse synthetic images.

According to an example embodiment of the present invention, the method may comprise determining the label map to emulate a digital image output of an image sensor, in particular a video, radar, LiDAR, ultrasonic, motion or thermal image sensor, wherein a control signal for a computer-controlled machine, in particular a robot, preferably a vehicle or a vehicle for autonomous driving, a domestic appliance, a power tool a manufacturing machine, a personal assistant, a device for automatic optical inspection, or an access system, is determined by a model depending on the synthetic image, in particular a model comprising an object detector configured for detecting objects in the synthetic image, or a classifier configured for classifying the synthetic image or objects in the synthetic image, or a segmenter, configured for segmenting the synthetic image, and wherein the model is trained depending on the synthetic image to determine the control signal and/or determining the label map and/or a selected first direction from the set of directions from user input detected by a graphical user interface, wherein a synthetic image is determined depending on the label map and/or latent code that is moved in the selected first direction and output by a display, in particular of the graphical user interface.

According to an example embodiment of the present invention, the device for determining pixels of a synthetic image, characterized in that the device comprises at least one processor and at least one memory, wherein the at least one memory is configured to store computer-readable instructions that when executed by the at least one processor cause the device to execute steps of the method of the present invention and wherein the at least one processor is configured to execute the instructions. This device has advantages that correspond to the advantages of the method.

According to an example embodiment of the present invention, a computer program may comprise computer-readable instructions that when executed by a computer cause the computer to perform the steps of the method of the present invention. This computer program has advantages that correspond to the advantages of the method.

This optimization finds disentangled class-specific latent controls. The latent directions found in the optimization can effectively control the local appearance of semantic classes, e.g., changing their internal structure, texture or color independently from each other. This significantly improves diversity of the class-specific edits while maintaining good image quality.

Further embodiments of the present invention are derived from the following description and the figures.

DETAILED DESCRIPTION OF EXAMPLE EMBODIMENTS

Figure 1:
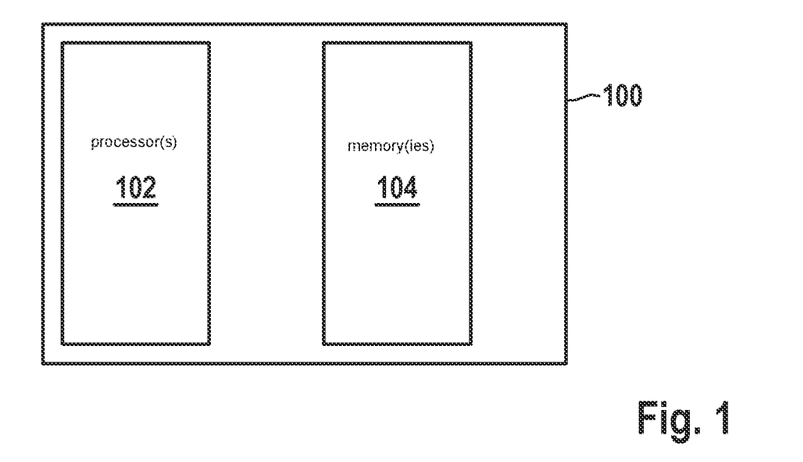
FIG. 1 schematically depicts a device for determining pixels of a synthetic image, according to an example embodiment of the present invention.

FIG. 1 schematically depicts a device 100 for determining pixels of a synthetic image. The device 100 comprises at least one processor 102 and at least one memory 104.

The at least one memory 104 is configured to store computer-readable instructions that when executed by the at least one processor 102 cause the device 100 to execute steps of a method, that is described below.

The at least one processor 102 is configured to execute the instructions.

Figure 2:
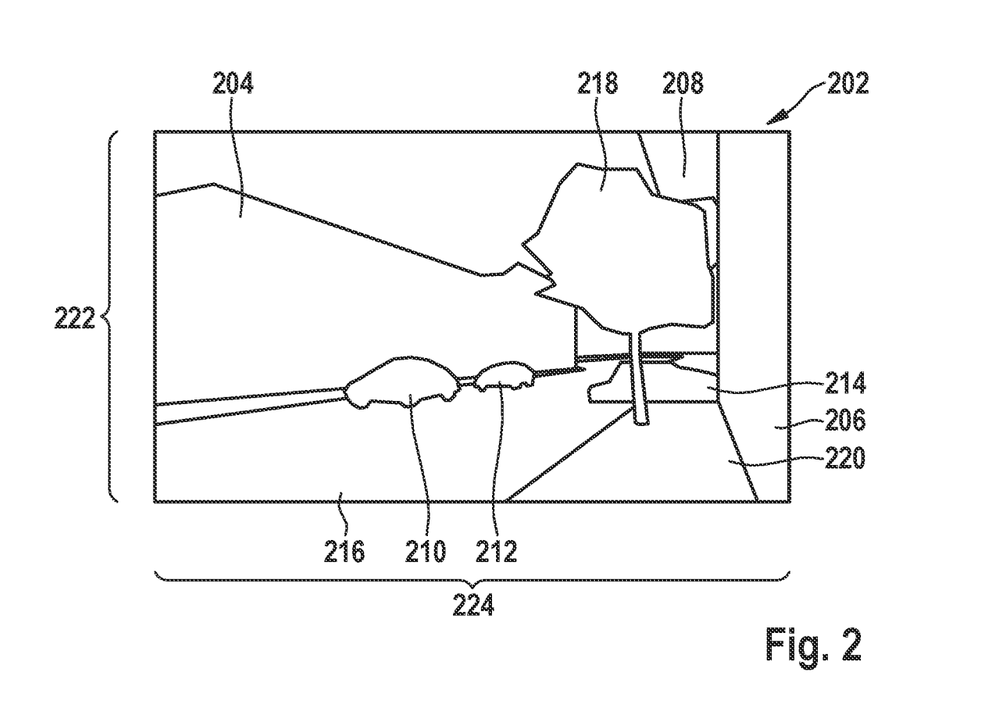
FIG. 2 schematically depicts a digital image, according to an example embodiment of the present invention.

FIG. 2 schematically depicts a digital image 202. The digital image 202 may be a generated image. The digital image 202 comprises a first building 204, a second building 206, a third building 208, a first car 210, a second car 212, and a third car 314. The first building 204 is located on a left side of the digital image and the second building 206 is located on a right side of the digital image 202. These buildings are located on opposite sides of a road 216 that extends from a lower left corner of the digital image 202 to the third building 208 which is located on an upper right corner of the digital image 202.

The first car 210 is located in the digital image 202 left of the second car 212. The third car 214 is located in the digital image 202 right of the second car 210. The first car 210 and the second car 212 are located closer to the first building 204 than the third car 212.

A tree 218 and a walkway 220 are located in the digital image 202 between the second building 206 and the road 216.

In the example, the digital image 202 has a height 220 and a width 222. The digital image 202 comprises pixels. The digital image 202 for example has a height 220 of H=756 pixel and a width 222 of W=1024 pixels. This exemplary digital image 202 comprises 1024*756=774144 pixel.

Figure 3:
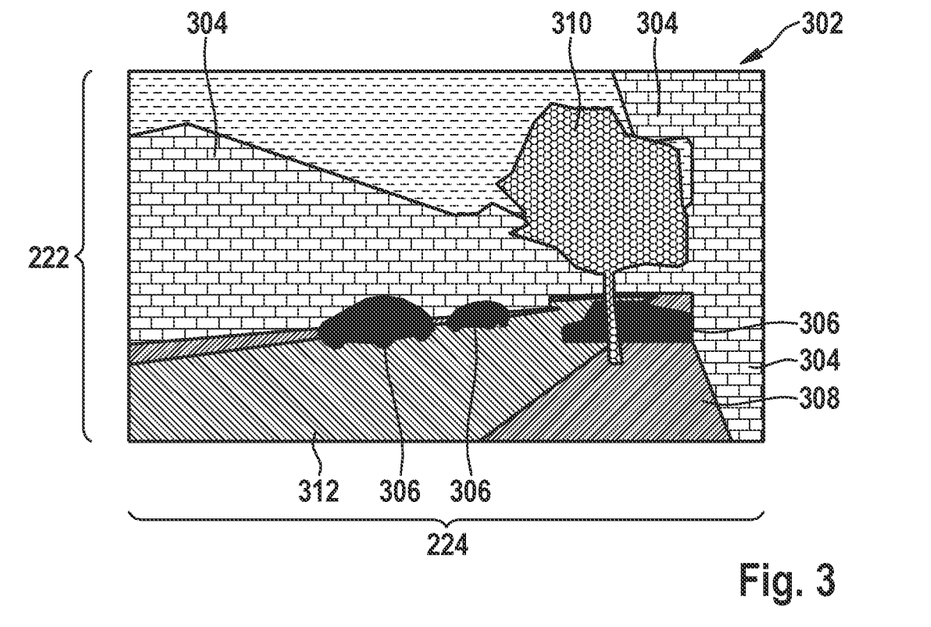
FIG. 3 schematically depicts a label map for the digital image, according to an example embodiment of the present invention.

FIG. 3 schematically depicts a label map 302 for the digital image 202. The label map 302 may have the same dimensions as the digital image 202. The label map 302 comprises a mapping $y \in \mathbb{R}^{H \times W \times C}$ of at least one class $c \in C$ of a plurality of classes C to at least one of the pixels of the digital image 202. In the exemplary label map 302 depicted in FIG. 3, the plurality of classes C comprise a class for building, car, walkway, tree, and street. The plurality of classes C is not limited to comprising these exemplary classes. The plurality of classes C is for example selected from a domain that is suitable for explaining a content of the digital image. The mapping y in the example assigns the pixels of the digital image 202 that represent the first building 204, the second building 206 and the third building 208 a first class 304, building. The mapping y in the example assigns the pixels of the digital image 202 that represent the first car 210, the second car 212 and the third car 214 a second class 306, car. The mapping y in the example assigns the pixels of the digital image 202 that represent the walkway 220 a third class 308, walkway. The mapping y in the example assigns the pixels of the digital image 202 that represent the tree 218 a fourth class 310, tree. The mapping y in the example assigns the pixels of the digital image 202 that represent the street 216 a fifth class 312, street.

The label map 302 may have lower spacial dimensions as the digital image 202. The mapping y may assign a group of pixels to one class in this case.

Figure 4:
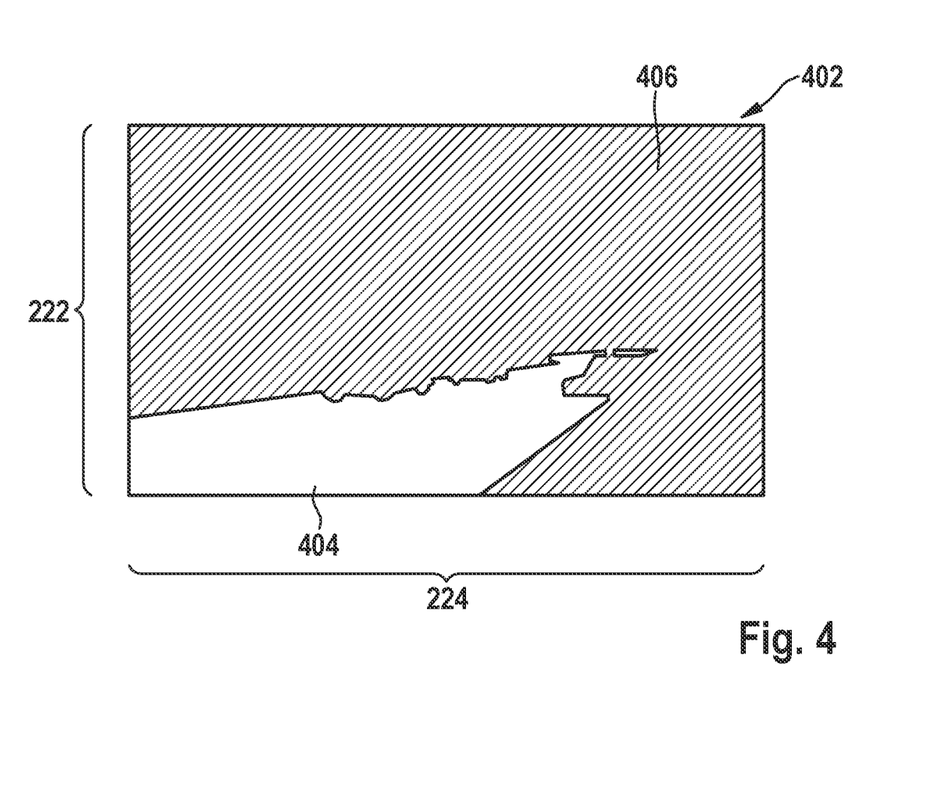
FIG. 4 schematically depicts a class mask for the digital image, according to an example embodiment of the present invention.

FIG. 4 schematically depicts a class mask 402 for the digital image 202. The class mask 402 comprises a mapping $M_c$ of at least one class $c \in C$ to at least one of the pixels of the digital images 202. In the example, the mapping $M_c$ is a binary map that maps a first binary value 404, e.g. One, to the pixels that according to the label map 302 represent the street and that maps a second binary value 406 that is different from the first binary value 404, e.g. Zero, to the pixels that according to the label map 304 represent the other pixels.

The class mask 402 may have the same or lower spacial dimensions as the label map 302. The mapping $M_c$ may assign a group of pixels the same binary value in this case.

Figure 5:
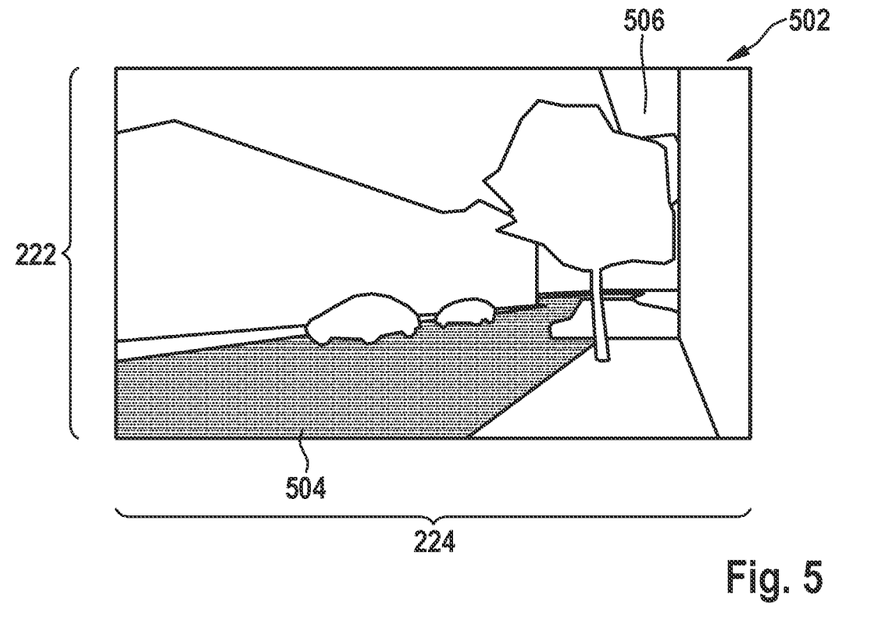
FIG. 5 schematically depicts a first synthetic image, according to an example embodiment of the present invention.

FIG. 5 schematically depicts a first synthetic image 502. The first synthetic image 502 comprises a first set of pixels 504 that correspond to the pixels that represent the street according to the class mask 402 and a second set of pixels 506 that correspond to the other pixels according to the class mask 402.

The synthetic image 502 may have the same special dimensions as the label map 302, the class mask 402 and/or the digital image 202.

In the example, the first set of pixels 504 that represents the street is different in color from the pixels of the digital image 202 that represent the street 216. In the example, the second set of pixels 506 is unchanged compared to the digital image 202.

Figure 6:
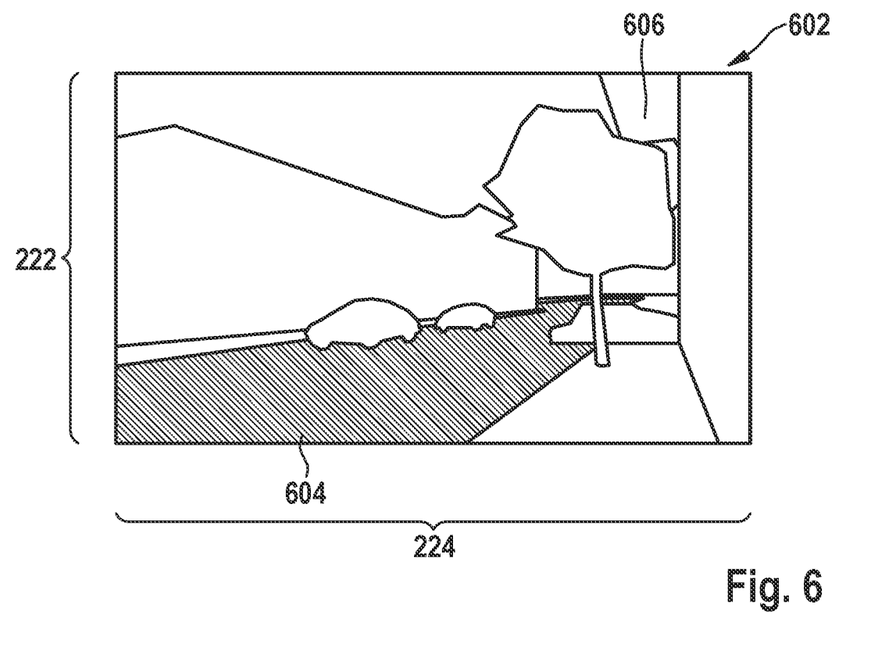
FIG. 6 schematically depicts a second synthetic image, according to an example embodiment of the present invention.

FIG. 6 schematically depicts a second synthetic image 602. The second synthetic image 602 comprises a first set of pixels 604 that correspond to the pixels that represent the street according to the class mask 402 and a second set of pixels 606 that correspond to the other pixels 606 according to the class mask 402.

In the example, the first set of pixels 604 that represents the street is different in color from the pixels of the digital image 202 that represent the street 216 and from the first set of pixels 504 of the first synthetic image 502. In the example, the second set of pixels 606 is unchanged compared to the digital image 202.

Figure 7:
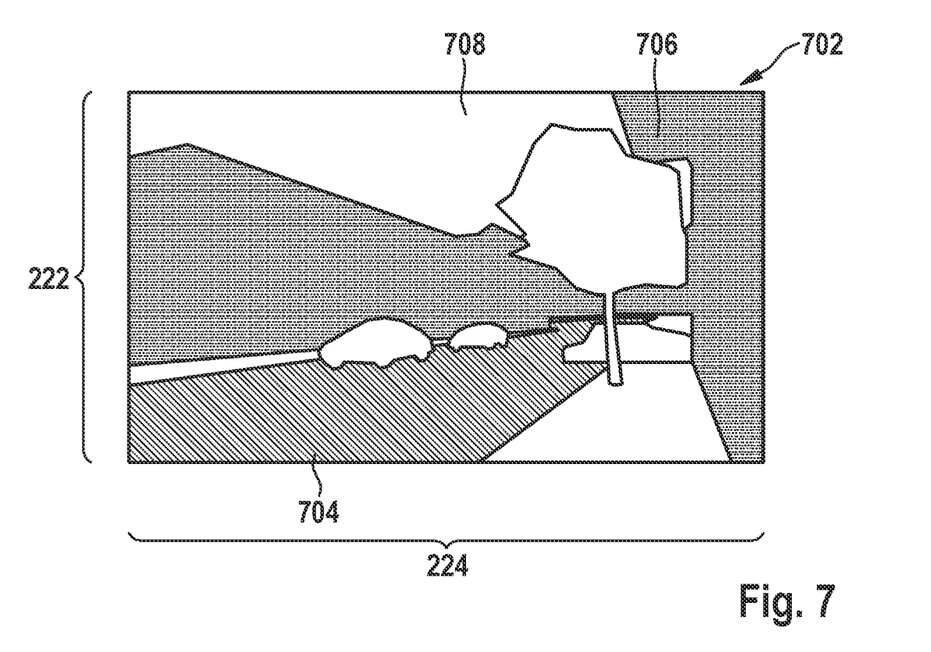
FIG. 7 schematically depicts a third synthetic image, according to an example embodiment of the present invention.

FIG. 7 schematically depicts a third synthetic image 702. The third synthetic image 702 is based on another class mask that comprises a mapping $M_c$ that assigns the first binary value to pixels that according to the label map 302 represent the street or the building. The third synthetic image 702 comprises a first set of pixels 704 that correspond to the pixels that represent the street according to label map 302 and a second set of pixels 706 that corresponds to the pixels that represent the buildings according to the label map 302 and a third set of pixels 708 that correspond to the other pixels according to the label map 302.

In the example, the first set of pixels 704 that represents the street is different in color from the pixels of the digital image 202 that represent the street 216. In the example, the second set of pixels 706 that represents the buildings is different in color from the pixels of the digital image 202 that represent the first building 204, the second building 206 and the third building 308. In the example, the third set of pixels 708 is unchanged compared to the digital image 202.

Figure 8:
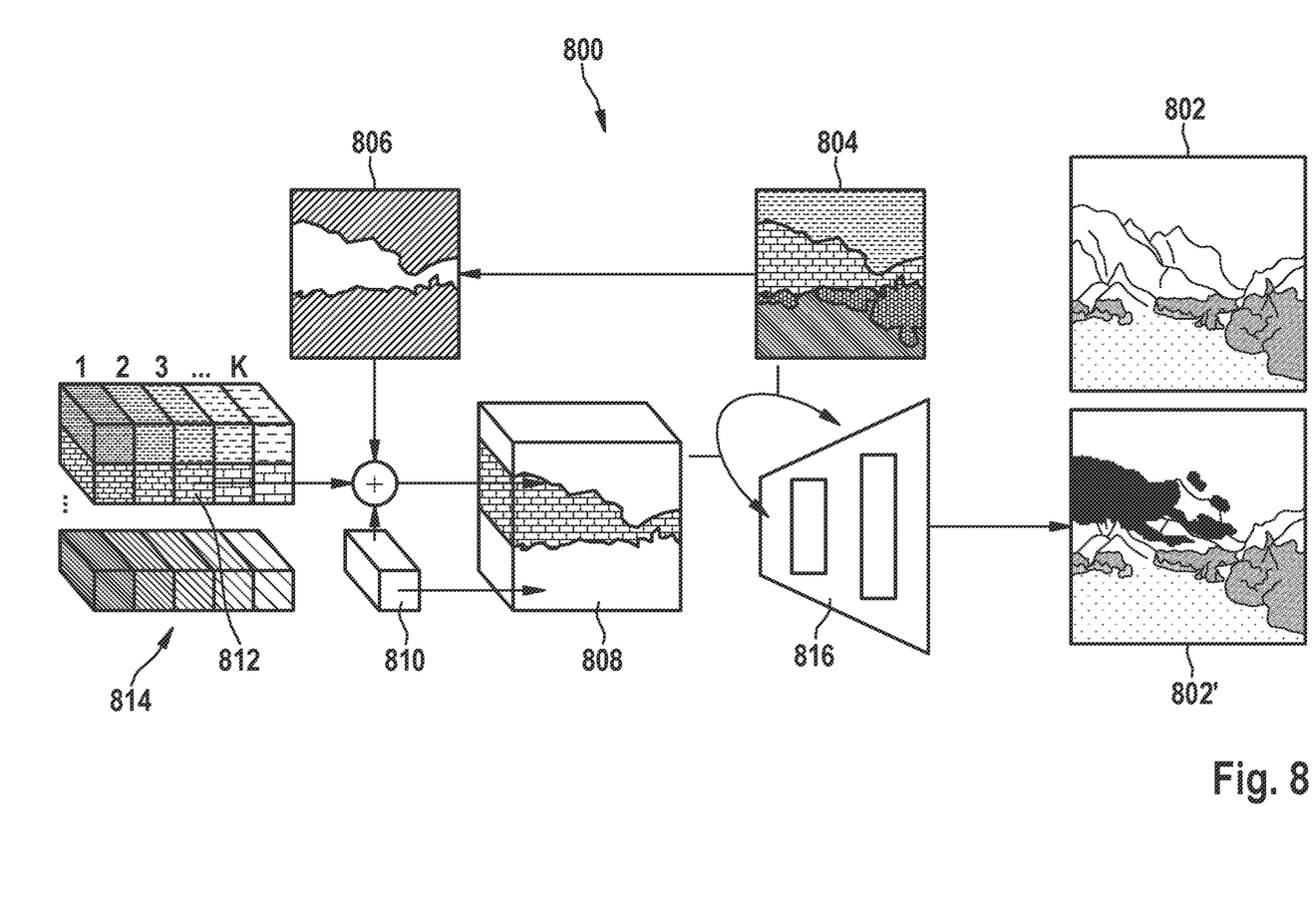
FIG. 8 schematically depicts a process for determining pixels of a synthetic image, according to an example embodiment of the present invention.

FIG. 8 schematically depicts a process 800 for determining pixels of a synthetic image 802'.

The process 800 aims at generating synthetic images 802, 802'. The process 800 comprises providing a label map 804 for the synthetic images 802, 802'. The label map 804 comprises a mapping of at least one class $c \in C$ to at least one of the pixels.

The process 800 comprises providing a class mask 806. The class mask 806 comprises a mapping of at least one class $c \in C$ to at least one of the pixels.

The process 800 comprises providing a latent code 808. The latent code comprises input data points 810 in a latent space. The latent code is for example sampled.

The latent code 808 may be spatially aligned with the class mask 806 and/or the label map 804 and/or the synthetic images 802, 802'. In one example, the class mask 806 is stored in an at least two-dimensional tensor, the latent code 808 is stored in an at least three-dimensional tensor, the label map 804 is stored in an at least three-dimensional tensor and the synthetic image 802 or 802' is stored in an at least three-dimensional tensor. The at least three-dimensional tensor for the synthetic image 802 or 802' in one example has a dimension corresponding to a width of the synthetic image 802 or 802' and a dimension corresponding to a height of the synthetic image 802 or 802'. The width of the synthetic image 802 or 802' may be a given width 222 of the digital mage 202. The height of the synthetic image 802 or 802' may be the height 224 of the digital image 202. Spatially aligned in this context may mean that the tensor for the class mask 806 and/or the label map 804 comprises a dimension of the same size as the dimension corresponding to the width of the synthetic image 802 or 802' and a dimension of the same size as the dimension corresponding to the height of the synthetic image 802 or 802'.

The process 800 comprises providing a direction 812 from a plurality of class specific directions 814 for moving input data points 810 in the latent space. In the example, the plurality of class specific directions 814 comprises K directions for each class c∈C. The class mask 806 indicates the input data points 810 to be moved in the first direction 812 for the class c.

The process 800 comprises determining the latent code 808 depending on the input data point 810 that is moved in the direction 812. The process 800 comprises moving the input data point 810 if it is selected for moving by the class mask 806, e.g. in case the first binary value, and otherwise not moving the input data point 810.

The process 800 comprises determining the synthetic image 802 or 802' depending on an output of a generator 816 for an input that comprises the label map 804 and the class mask 802 and the latent code 808.

In the example, the generator 816 is a well-trained generator G of a Semantic Image Synthesis, SIS, model. This means, for example, the generator is configured to synthesize digital images from label maps and latent code.

The generator G for example comprises a neural network. The generator G in this example comprises an input layer and an output layer and at least one intermediate layer l∈L between the input layer and the output layer.

The generator $G=G(z, v_k, y)$ is configured in one example to synthesize the synthetic image globally given a three-dimensional latent code $z \in \mathbb{R}^{H \times W \times D}$ and the label map $y \in \mathbb{R}^{H \times W \times C}$ of a same spatial dimension and with a latent dimension D, a direction $v_k \in \mathbb{R}^{H \times W \times D}$, the binary mask $M_c = 1_{[y=c]}$ and an intensity α that controls an intensity of a change:

$$x(v_k) = G(z + \alpha v_k, y) = F(h(z, v_k, y))$$

where $$h(z, v_k, y) = \{G_l(z, y)\}_{l \in L}$$

is the features or a chosen subset of features from the intermediate layers l∈L in the generator $G(z, v_k, y)$. The generator G and the latent code z is not restricted to a three-dimensional latent space. The latent code z may have more than three dimensions.

The generator $G = G(z, v_k^c, y)$ is configured in one example to synthesize the synthetic image locally, given the three-dimensional latent code $z \in \mathbb{R}^{H \times W \times D}$ and the label map $y \in \mathbb{R}^{H \times W \times C}$, a class specific direction $v_k^c \in \mathbb{R}^{H \times W \times D}$, the binary mask $M_c = 1_{[y=c]}$ and the intensity α. In one example for a synthetic image $$x(v_k^c) = G(z + \alpha M_c \odot v_k^c, y) = F(h(z, v_k^c, y))$$

To synthesize the synthetic image locally may result in changing only selected pixels, i.e. pixels that are indicated in the $M_c$, compared to a synthetic image that results from synthesizing the synthetic image from the same latent code z without moving part of it in the first direction $v_k^c$.

Figure 9:
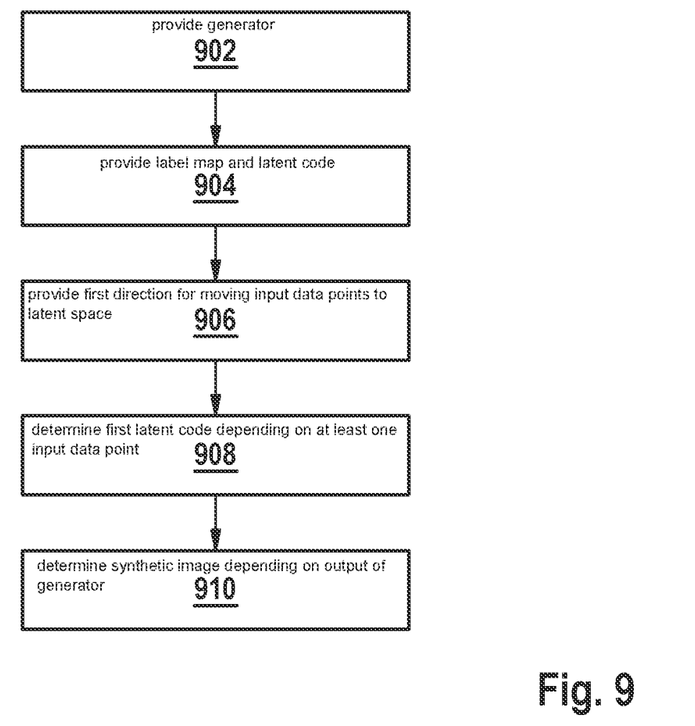
FIG. 9 schematically depicts a method for determining pixels of the synthetic image, according to an example embodiment of the present invention.

FIG. 9 schematically depicts a method for determining pixels of the synthetic image. The method finds a diverse set of K class specific directions $V^c = \{v_1^c, \ldots, v_k^c\}$, K>0 that can meaningfully edit an appearance of pixels of class c in the synthetic image x, such that image $x(v_k^c)$ has a visually distinct appearance of class c compared to the synthetic image x.

This is achieved by an optimization objective L.

In one example, for the whole synthetic image x and the direction $v_k$ that is independent of the class c the optimization objective comprises a diversity loss that depends on an expectancy value $E_{(z,y)}$ $$L_{div} = -E_{(z,y)} \left[ \sum_{\substack{k_{1,2} \\ k_1 \neq k_2}}^{K} \|h(z, v_{k_1}, y) - h(z, v_{k_2}, y)\|_2 \right]$$

wherein $\| \|_2$ is the L2 Norm.

This means, the expectancy value $E_{(z,y)}$ depends on different pairs of sets of features h that the intermediate layer l outputs.

The optimization objective is to find the set of directions V that maximizes the distances between the different pairs of sets of features that the intermediate layer l outputs for different first inputs. The different first inputs comprise the same label map y and vary by the first direction $v_{k_i}$ that is used for determining the first latent code from the same latent code z.

This loss aims to ensure that the set of found class specific directions V applied to identical input latent code z yields maximally different semantic visual effects, i.e. change an appearance in a different way.

The optimization objective comprises in one example a consistency loss that depends on an expectancy value $E_{(z,y)}$ as follows:

$$L_{const} = -E_{(z,y)} \left[ \sum_{k=1}^{K} \|h(z_1, v_k, y) - h(z_2, v_k, y)\|_2 \right]$$

This means, the expectancy value $E_{(z,y)}$ depends on different pairs of sets of features h that the intermediate layer l outputs.

The optimization objective is to find the set of directions V that maximizes the distances between the different pairs of sets of features that the intermediate layer l outputs for different first inputs. The different first inputs comprise the same label map y and and vary by the latent code z that is used for determining the first latent code with the same first direction.

This loss aims to ensure that identical directions in the set of found directions V applied to different input latent code $z_1, z_2$ yields consistent semantic visual effects, i.e. change an appearance in a consistent way.

In one example, the optimization objective is to find the directions V that minimize the diversity loss:

$$\min_V L_{div}$$

This encourages a set of class specific controls, i.e. directions V, to be diverse and introduce different semantic changes.

In one example, the optimization objective is to find the directions V that minimize the following loss:

$$\min_V L_{div} + L_{const}$$

The optimization objective comprises in one example a class specific diversity loss that depends on an expectancy value $E_{(z,y)}$ as follows:

$$L_{div} = -E_{(z,y)} \left[ \sum_{\substack{k_{1,2} \\ k_1 \neq k_2}}^{K} M_c \| h(z, v^c_{k_1}, y) - h(z, v^c_{k_2}, y) \|_2 \right]$$

This means, the expectancy value $E_{(z,y)}$ depends on different pairs of sets of features h that the intermediate layer l outputs for pixels indicated by the class mask $M_c$ to be considered.

The optimization objective is to find the set of directions $V^c$ that maximizes the distances between the different pairs of sets of features that the intermediate layer l outputs for different first inputs. The different first inputs comprise the same label map y and the same class mask $M_c$ and vary by the first direction $v_{k_i}^c$ that is used for determining the first latent code from the same latent code z.

This loss aims to ensure that the set of found class specific directions $V^c$ applied to identical input latent code z yields maximally different semantic visual effects, i.e. change an appearance of class c in a different way.

The optimization objective comprises in one example a class specific disentanglement loss that depends on an expectancy value $E_{(z,y)}$ as follows:

$$L_{dis} = -E_{(z,y)} \left[ \sum_{\substack{k_{1,2} \\ k_1 \neq k_2}}^{K} (1 - M_c) \| h(z, v^c_{k_1}, y) - h(z, v^c_{k_2}, y) \|_2 \right]$$

This means, the expectancy value $E_{(z,y)}$ depends on different pairs of sets of features h that the intermediate layer l outputs for pixels indicated by the class mask $M_c$ to be considered.

The optimization objective is to find the set of directions $V^c$ that maximizes the distances between the different pairs of sets of features that the intermediate layer l outputs for different first inputs. The different first inputs comprise the same label map y and the same class mask $M_c$ and vary by the first direction $v_{k_i}^c$ that is used for determining the first latent code from the same latent code z.

This loss aims to ensure that the set of found class specific directions $V^c$ only affect the image area belonging to the class c in the label map y and leave the rest of the pixels unaffected.

The optimization objective comprises in one example a class specific consistency loss that depends on an expectancy value $E_{(z,y)}$ as follows:

$$L_{const} = -E_{(z,y)} \left[ \sum_{k=1}^{K} M_c \| h(z_1, v^c_k, y) - h(z_2, v^c_k, y) \|_2 \right]$$

This means, the expectancy value $E_{(z,y)}$ depends on different pairs of sets of features h that the intermediate layer l outputs for pixels indicated by the class mask $M_c$ to be considered.

The optimization objective is to find the set of directions $V^c$ that maximizes the distances between the different pairs of sets of features that the intermediate layer l outputs for different first inputs. The different first inputs comprise the same label map y and the same class mask $M_c$ and vary by the latent code z that is used for determining the first latent code with the same first direction.

This loss aims to ensure that identical directions in the set of found class specific directions $V^c$ applied to different input latent code $z_1, z_2$ yields consistent semantic visual effects, i.e. change an appearance of class c in a consistent way.

In one example, the optimization objective is to find the class specific directions $V^c$ that minimize the diversity loss:

$$\min_{V^c} L_{div}$$

This encourages a set of class specific controls, i.e. class specific directions $V^c$, to be diverse and introduce different semantic changes to the class c.

In one example, the optimization objective is to find the class specific directions $V^c$ that minimize one of the following losses:

$$\min_{V^c} L_{div} + L_{dis}$$

$$\min_{V^c} L_{div} + L_{const}$$

$$\min_{V^c} L_{div} + L_{dis} + L_{const}$$

This encourages a set of class specific controls, i.e. class specific directions $V^c$, to be diverse and introduce different semantic changes to the class c and to not affect other classes in the synthetic image and consistent semantic changes of class c by $v_k^c$ independent of the sampled latent code z.

The method for determining pixels of the synthetic image x comprises a step 902.

In the step 902, the method comprises providing the generator 816, in particular the generator G that is configured to determine its output from a first input.

The generator G comprises the input layer for receiving the first input and the output layer for the output and at least one intermediate layer l between the input layer and the output layer.

An intermediate layer l of the neural network is configured to determine depending on the first input a set of features in the latent space, i.e. a feature space of the neural network.

The method comprises a step 904.

In the step 904 the method comprises providing the label map y and the latent code z.

The latent code z comprises input data points in the latent space.

Optionally, the step 904 comprises providing the class mask $M_c$.

In the example, the class mask $M_c$ is determined depending on the label map y and the class c.

The class mask $M_c$ specifies pixels in the synthetic image that the label map y specifies as pixels of the class c.

The method comprises a step 906.

In the step 906 the method comprises providing the first direction for moving input data points in the latent space.

In one example, the first direction $v_k$ is provided. The first direction $v_k$ is for example selected from a set of directions V. The set of directions V is for example determined to minimize the diversity loss $$\min_{V} L_{div}$$

or the following loss:

$$\min_V L_{div} + L_{const}$$

In one example, the class specific first direction $v_k^c$ is provided. The class specific first direction $v_k^c$ is for example selected for a class c from the class specific set of directions $V^c$.

The class specific set of directions $V^c$ is in one example determined. The class specific set of directions $V^c$ may be determined with the generator 816.

In one example, the class specific set of directions $V^c$ is determined that minimizes the diversity loss:

$$\min_{V^c} L_{div}$$

In one example, the class specific set of directions $V^c$ is determined that minimizes the following loss:

$$\min_{V^c} L_{div} + L_{dis}$$

In one example, the class specific set of directions $V^c$ is determined that minimizes the following loss:

$$\min_{V^c} L_{div} + L_{const}$$

In one example, the class specific set of directions $V^c$ is determined that minimizes the following loss:

$$\min_{V^c} L_{div} + L_{dis} + L_{const}$$

The set of directions is determined for example with a gradient descent method.

The method comprises a step 908.

In the step 908 the method comprises determining the first latent code depending on at least one input data point of the latent code z that is moved in the first direction.

The first input in one example comprises the label map y and the first latent code $z+\alpha v_k$.

This means, moving the latent code z or a part of the latent code z in the first direction in particular with a given intensity $\alpha$.

This alters the latent code across the pixels independent of the class.

The first input optionally comprises the label map y and the class mask $M_c$ and the first latent code $z+\alpha M_c \odot v_k^c$.

This means, moving a part of the latent code z by selecting the part of the latent code z depending on the class mask c. This alters the latent code z in areas identified by the class mask $M_c$.

The method comprises a step 910.

In the step 910 the method comprises determining the synthetic image depending on an output of the generator for the first input.

In one example, the synthetic image $x(v_k)=G(z+\alpha v_k, y)=F(h(z, v_k, y))$ is determined.

In one example, the synthetic image $x(v_k^c)=G(z+\alpha M_c \odot v_k^c, y)=F(h(z, v_k^c, y))$ is determined.

The method may comprise moving in several directions.

The latent code is for example moved jointly in two directions $v_1, v_2$ of the set of class specific directions $V^c$ for two distinct classes, e.g. a class $c_1$ and a class $c_2$. The latent code may be moved for more than two classes jointly.

The latent code z may be injected into the generator 816 at various layer.

The generator 816 may comprise the first layer of neurons and a second layer of neurons. The first input may be provided to the first layer. The method may comprise determining a second input comprising either the first latent code or a second latent code. The method may comprise providing the second input to the second layer.

Determining the second input may comprise changing the latent code depending on either the first direction or a second direction.

Determining the second input may comprise providing an other latent code and changing the other latent code depending on either the first direction or a second direction.

Determining the second input may comprise determining the second direction depending on the at least one semantic class.

The two directions $v_1, v_2$ may be injected to the same layer or the same layers in the generator 816 or into separate subsets of layers.

The method may comprise learning different directions on different subset of layers for the same class c, e.g. building. For example, a direction $v_1^c$ learnt on one subset of features can introduce color changes. For example, a direction $v_2^c$ learnt on another subset of features can introduce structural changes. Structural changes may be changes to a structure of a building e.g. the placement of the windows in the building.

Combining and using these two directions $v_1^c, v_2^c$, the method introduces the change to the building class c, changing both the structure and color of the building These two directions $v_1^c, v_2^c$, may be injected to the same layer or the same layers in the generator 816 or into separate subsets of layers.

For data autmentation the method may comprise synthesizing a plurality of the synthetic images with the same label map and with different first directions.

For data validation the method may comprise testing a robustness or functionality of an application for processing digital images depending on a plurality of the synthetic images.

The label map may be determined to emulate a digital image output of an image sensor, in particular a video, radar, LiDAR, ultrasonic, motion or thermal image sensor.

The method may comprise determining a control signal for a computer-controlled machine by a model depending on the synthetic image. The model is in one example trained depending on the synthetic image to determine the control signal.

The computer-controlled machine may be a robot. The robot may be a vehicle or a vehicle for autonomous driving, a domestic appliance, a power tool a manufacturing machine, a personal assistant, a device for automatic optical inspection, or an access system.

The model may comprise an object detector configured for detecting objects in the synthetic image.

The model may comprise a classifier configured for classifying the synthetic image or objects in the synthetic image.

The model may comprise a segmenter, configured for segmenting the synthetic image.

For an image editing application, the method in one example comprises determining the label map from user input detected by a graphical user interface. The synthetic image is for example output by a display, in particular of the graphical user interface.

In this case, a user may draft the label map and then modify the synthesized image using the learnt directions. The user may select the first direction from the set of directions. The synthetic image resulting from moving the latent code with the selected first direction is for example output.

What is claimed is:

1. A computer-implemented method for determining pixels of a synthetic image, the method comprising the following steps:
providing a generator that is configured to determine an output from a first input including a label map and a first latent code, wherein the label map includes a mapping of at least one class to at least one of the pixels;
providing the label map and a latent code, wherein the latent code includes input data points in a latent space;
providing a first direction for moving input data points in the latent space;
determining the first latent code depending on at least one input data point of the latent code that is moved in the first direction; and
determining the synthetic image depending on an output of the generator for the first input;
wherein the first input includes a class mask, wherein the class mask indicates the input data points to be moved in the first direction for a class, wherein providing the first direction includes providing the class, providing a set of directions for moving input data points indicated by the class mask in the latent space, and selecting the first direction from the set of directions;
wherein the generator includes an input layer configured to receive the first input, an output layer for the output, and at least one intermediate layer between the input layer and the output layer, wherein the at least one intermediate layer is configured to determine a set of features in the latent space depending on the first input, and wherein:
the providing of the set of directions includes determining the set of directions that maximizes distances between different pairs of sets of features that the at least one intermediate layer outputs for different first inputs, wherein the different first inputs include the same label map and vary by the first direction that is used for determining the first latent code from the same latent code, or
the providing of the set of directions for the class includes determining, for pixels indicated by the class mask to be considered, the set of directions that maximizes distances between different pairs of sets of features that the at least one intermediate layer outputs for different first inputs, wherein the different first inputs include the same label map and the same class mask and vary by the first direction that is used for determining the first latent code from the same latent code.

2. The method according to claim 1, wherein the providing of the set of directions for the class includes determining, for pixels, indicated by the class mask to be considered, the set of directions that maximizes distances between different pairs of sets of features that the at least one intermediate layer outputs for different first inputs, wherein the different first inputs include the same label map and the same class mask and vary by the first direction that is used for determining the first latent code from the same latent code.

3. The method according to claim 1, wherein:
the providing of the set of directions includes determining the set of directions that maximizes distances between different pairs of sets of features that the at least one intermediate layer outputs for different first inputs, wherein the different first inputs include the same label map and vary by the latent code that is used for determining the first latent code with the same first direction; or
the providing of the set of directions for the class includes determining, for pixels, indicated by the class mask to be considered, the set of directions that maximizes distances between different pairs of sets of features that the at least one intermediate layer outputs for different first inputs, wherein the different first inputs include the same label map and the same class mask and vary by the latent code that is used for determining the first latent code with the same first direction.

4. The method according to claim 1, wherein the providing of the class mask includes determining the class mask depending on the label map and the class, wherein the class mask specifies pixels in the synthetic image that the label map specifies as pixels of the class.

5. The method according to claim 1, wherein the determining if the first latent code includes moving the latent code or a part of the latent code in the first direction with a given intensity.

6. The method according to claim 5, further comprising selecting the part of the latent code depending on the class mask.

7. The method according to claim 1, wherein the latent code is spatially aligned with the class mask and/or the label map and/or the synthetic image.

8. The method according to claim 1, wherein the generator includes a first layer of neurons and a second layer of neurons, wherein the determining of the synthetic image includes providing the first input to the first layer, determining a second input including either the first latent code or a second latent code, and providing the second input to the second layer.

9. The method according to claim 8, wherein:
the determining of the second input includes changing the latent code depending on either the first direction or a second direction, or
the determining of the second input includes providing another latent code and changing the other latent code depending on either the first direction or a second direction.

10. The method according to claim 9, wherein the determining of the second input includes determining the second direction depending on at least one semantic class.

11. The method according to claim 1, further comprising:
synthesizing a plurality of the synthetic images with the same label map and with different first directions and/or testing a robustness or functionality of an application for processing digital images depending on a plurality of the synthetic images.

12. The method according to claim 1, wherein the label map is determined to emulate a digital image output of an image sensor, the image sensor including a video sensor, or radar sensor, or LiDAR sensor, or ultrasonic sensor, or motion sensor, or thermal image sensor, wherein a control signal for a computer-controlled machine is determined by a model depending on the synthetic image, the computer-controlled machine including a robot, or a vehicle, or a vehicle for autonomous driving, or a domestic appliance, or a power tool, or a manufacturing machine, or a personal assistant, or a device for automatic optical inspection, or an access system, and the model includes an object detector configured for detecting objects in the synthetic image, or a classifier configured for classifying the synthetic image or objects in the synthetic image, or a segmenter, configured for segmenting the synthetic image, and wherein the model is trained depending on the synthetic image to determine the control signal and/or determining the label map and/or a selected first direction from the set of directions from user input detected by a graphical user interface, and wherein a synthetic image is determined depending on the label map and/or latent code that is moved in the selected first direction and output by a display of the graphical user interface.

13. A device configured to determine pixels of a synthetic image, the device comprising:
   at least one processor; and
   at least one memory, wherein the at least one memory is configured to store computer-readable instructions that when executed by the at least one processor cause the at least one processor to execute the following steps:
   providing a generator that is configured to determine an output from a first input including a label map and a first latent code, wherein the label map includes a mapping of at least one class to at least one of the pixels,
   providing the label map and a latent code, wherein the latent code includes input data points in a latent space,
   providing a first direction for moving input data points in the latent space,
   determining the first latent code depending on at least one input data point of the latent code that is moved in the first direction, and
   determining the synthetic image depending on an output of the generator for the first input;
   wherein the first input includes a class mask, wherein the class mask indicates the input data points to be moved in the first direction for a class, wherein providing the first direction includes providing the class, providing a set of directions for moving input data points indicated by the class mask in the latent space, and selecting the first direction from the set of directions;
   wherein the generator includes an input layer configured to receive the first input, an output layer for the output, and at least one intermediate layer between the input layer and the output layer, wherein the at least one intermediate layer is configured to determine a set of features in the latent space depending on the first input, and wherein:
   the providing of the set of directions includes determining the set of directions that maximizes distances between different pairs of sets of features that the at least one intermediate layer outputs for different first inputs, wherein the different first inputs include the same label map and vary by the first direction that is used for determining the first latent code from the same latent code, or
   the providing of the set of directions for the class includes determining, for pixels indicated by the class mask to be considered, the set of directions that maximizes distances between different pairs of sets of features that the at least one intermediate layer outputs for different first inputs, wherein the different first inputs include the same label map and the same class mask and vary by the first direction that is used for determining the first latent code from the same latent code.

14. A non-transitory computer-readable medium on which is stored a computer program for determining pixels of a synthetic image, the computer program, when executed by a computer, causing the computer to perform the following steps:
   providing a generator that is configured to determine an output from a first input including a label map and a first latent code, wherein the label map includes a mapping of at least one class to at least one of the pixels;
   providing the label map and a latent code, wherein the latent code includes input data points in a latent space;
   providing a first direction for moving input data points in the latent space;
   determining the first latent code depending on at least one input data point of the latent code that is moved in the first direction; and
   determining the synthetic image depending on an output of the generator for the first input;
   wherein the first input includes a class mask, wherein the class mask indicates the input data points to be moved in the first direction for a class, wherein providing the first direction includes providing the class, providing a set of directions for moving input data points indicated by the class mask in the latent space, and selecting the first direction from the set of directions;
   wherein the generator includes an input layer configured to receive the first input, an output layer for the output, and at least one intermediate layer between the input layer and the output layer, wherein the at least one intermediate layer is configured to determine a set of features in the latent space depending on the first input, and wherein:
   the providing of the set of directions includes determining the set of directions that maximizes distances between different pairs of sets of features that the at least one intermediate layer outputs for different first inputs, wherein the different first inputs include the same label map and vary by the first direction that is used for determining the first latent code from the same latent code, or
   the providing of the set of directions for the class includes determining, for pixels indicated by the class mask to be considered, the set of directions that maximizes distances between different pairs of sets of features that the at least one intermediate layer outputs for different first inputs, wherein the different first inputs include the same label map and the same class mask and vary by the first direction that is used for determining the first latent code from the same latent code.

* * * * *